United States Patent Office 2,876,110
Patented Mar. 3, 1959

2,876,110

COMPOSITION AND METHOD FOR PRESERVING THE QUALITY OF SHELL EGGS

William J. Stadelman and Melvin L. Wilson, Lafayette, Ind., assignors to Liqua-Mix, Inc., Indianapolis, Ind., a corporation of Indiana No Drawing. Application February 20, 1958
Serial No. 716,272

7 Claims. (Cl. 99—170)

This invention relates to a composition and method for preserving the quality and shelf life of shell eggs.

In the production and marketing of shell eggs, the eggs are often stored for relatively long periods of time before they are consumed. During this storage period, the quality of the eggs is substantially reduced to a greater or lesser degree depending upon a number of factors, such as whether they are stored at room temperature or under refrigeration, etc. This loss in quality comes about by the presence of pores in the shells which permit the eggs to breathe through said shells with the result that gases, principally carbon dioxide, and moisture leave the eggs. The loss of moisture and gas produces a thinning out of the egg albumen and an increase in the size of the egg air cell, both of which are major factors which affect and measure quality of the eggs and are the major factors commonly observed in the grading thereof. Because of the shell porosity, this loss of quality begins to occur immediately after the eggs have been laid.

Various treatments have been proposed and used to preserve the original quality of shell eggs. Heretofore such treatments have been principally concerned with dipping the eggs in an oil or oily mixture to coat the outer surface of the shell with an oily layer. While such methods produce the characteristic preservative results of sealing the pores in the shells to prevent the escape of carbon dioxide and moisture, they are relatively laborous and require special handling and dipping equipment. Such special handling and dipping equipment is relatively expensive, and therefore is generally found only at egg grading centers and/or egg collection stations. This means that the eggs are not treated until they have aged for about a week, during which time they will have lost a significant amount of their original quality. In such dipping operations the eggs are run through a common dipping bath which becomes contaminated with the dirt and filth on the eggs or other foreign matter, and thereby results in a high incidence of microbiological spoilage in the treated eggs. Moreover, the oil coating is relatively thick and gives the eggs a shiny appearance which lessens their marketability.

It is an object of this invention to provide a shell egg preservation treatment procedure and a composition therefor which will reduce the effective porosity of the shells and thereby preserve the quality of the eggs. It is a further object of the invention to provide an inexpensive shell egg preservative composition and preservative treatment procedure which may be used by individual egg producers for treating shell eggs soon after they are laid before they have lost any substantial amount of their original quality, and which will not give the shells an undesirable shiny appearance. It is still a further object of the invention to provide a preservative composition for shell eggs which can be kept free from bacteriological contamination to permit the aseptic treatment of the eggs to avoid to the highest degree any incidence of microbiological spoilage in the treated eggs.

The oil treatment of shell eggs produces several desirable results. It reduces the porosity of the shells so that the amount of weight lost by the eggs during storage is greatly reduced. Further, it prolongs the standard of quality which the eggs had at the time of lay. There is a reduction in the amount of moisture and carbon dioxide lost by the eggs with the result that the egg albumen retains its characteristic thickness and the volume of the air cell remains substantially constant. All of these factors contribute to the maintenance of the quality of the eggs.

We have discovered that shell egg preservation can be effectively and reliably carried out by applying a thin coating of a diluted oil spray or mist to only the blunt, or large, ends of the shells which overlie the air cells. This can be done on an economical, safe, and practical basis by the individual egg producing farmers by the simple expedient of using an oil in a pressurized spray can. The can is desirably pressurized by a highly volatile diluent which serves the dual functions of acting as a propellent for transferring the oil from the can to the eggs and diluting the oil to produce a fine spray carrying into the pores of the shells and coating the shells with a thin film of preservative, from which the diluent rapidly evaporates leaving only a small residue of the oil. Such a procedure permits the individual egg producers to treat the eggs at the source of production shortly after they have been laid, and further produces uniform high quality results.

In accordance with the invention, the oil is mixed with a diluent constituting an inert volatile propellent which is pressurized in a sealed container provided with a dispensing nozzle so that the oil and diluent may be propelled from the container to the eggs in the form of a fine spray or mist. Preferably, the oil and diluent are added aseptically to the container so that they will remain in a sterilized condition until they are dispensed from said container. Within a short period after the diluted oil mist has settled on the shells, the diluent evaporates leaving only a minute quantity of the oil as a residue which is absorbed into the shells and seals the pores thereof to prevent the escape of gases and moisture. Absorption of oil into the pores is accelerated due to the cooling effect of evaporating diluent causing cooling with resultant contraction of the content of the egg. These procedures may be, and desirably are, carried out by the individual egg producers within a short time, say within 24 hours, after the eggs have been laid.

The oil used is desirably a neutral oil which is nontoxic, fluid at room temperature, and seals the pores of the shells. Preferably, we use a paraffin base mineral oil which is readily available in quantity and at reasonable prices. Such oils are particularly desirable for treating shell eggs because they are colorless, odorless, tasteless, and are relatively nonoxidizable. One such oil that we have employed with satisfactory results is "Premier White Oil."

The diluent-propellent material used to dilute the oil and project it from the spray container is desirably a material that is miscible with the oil. Said diluent-propellant is a volatile diluent which will completely evaporate from the sprayed surface at room temperature within a few minutes. Conveniently, it may be a fully halogenated aliphatic compound having less than three carbon atoms. We have used mixtures of trichloromonofluoromethane and dichlorodifluoromethane, which are sold under the trade marks Freon 11 and Freon 12 respectively. These materials are odorless, non-corrosive, bactericidal, and remain stable over a prolonged period of storage. Further, their boiling points are below room temperature so that they quickly evaporate from the surfaces of the shells of the sprayed eggs.

The preservative composition is applied to the shells of the eggs in a single initial application in a concentration sufficient to produce characteristic results of quality preservation throughout a normal storage period. We have found that an extremely small quantity of oil is effective in maintaining the quality of the eggs, and may be less than an amount which would produce a shine on the eggs. By spraying only the large ends of the eggs the quality of the eggs may be maintained by applying the oil at a rate of only 30 mg. to 40 mg. per egg. The preservative may be sprayed on the eggs while they are in any convenient type of container. However, for reasons of economy of procedure we prefer to spray the eggs as they are packed in their shipping cases. In this manner, after one layer of eggs is put in the carton the spray is directed on the eggs, and then the next layer of eggs is packed over the treated layer and it is sprayed, and this procedure is repeated until the carton is filled. Our preservation treatment may be employed by the individual farmer as an incident to such packing and marketing procedures. In carrying out such an operation, a layer of eggs is placed on end in the individual compartments of a divider placed in the bottom of the packing case. The eggs are placed in the compartments of the divider with their large ends presented upwardly. After eggs have been placed in all of said compartments, the entire layer of eggs is sprayed with a fine mist of our diluted oil solution. The diluent rapidly evaporates leaving on each egg a residue of about 30 mg. to about 70 mg. of oil. The solution of oil and diluent is sprayed onto the eggs from a closed container by the vapor pressure of the diluent with the directed spray application and the side walls of the compartments of the divider confining the preservative treatment to the exposed blunt ends of the egg shells overlying the air cells of said eggs. After a layer of eggs has thus been packed and sprayed in the case, another divider is placed over the first layer of eggs, its compartments are filled with eggs, and the above described operation repeated in the manner described. This operation is repeated until the case is fully packed with the then treated eggs.

In the conventional practice of producing and marketing eggs, the eggs are gathered daily, usually during the morning. After the eggs are gathered they are chilled and may be washed and dried, after which they are packed in conventional egg cases. Such cases hold five layers of eggs, three dozen in each layer. In packing these cases, a layer divider is placed on the bottom of the case and an egg is placed on end in each of the compartments of the layer divider. The next layer of eggs is packed on the bottom layer in the same manner and this operation is repeated until the case is fully packed. The eggs are then held under refrigeration in their cases at farms until they are sent to an egg collection station. In many instances, depending upon the amount of eggs produced, the eggs are held at the farm for a week or more before they are taken to a collection station.

In preparing our preferred composition for spray treating shell eggs, we prepared a solution containing 30 ml. of Premium White Oil, 10 ml. of Freon 11 and 20 ml. of Freon 12. Because of the extremely low boiling points of the Freon, all of the equipment and materials used were stored at a temperature below 0° F. overnight prior to their use. The oil and Freon were added aseptically to a sterile container provided with an atomizing nozzle, and the container was allowed to warm to room temperature whereupon the Freon mixture produced a pressure within the container of about 40 p. s. i. to 50 p. s. i. In addition to the oil and Freon, the preservative composition may include other components, such as an organosiloxane polymer, that serve as moisture sealers and repellents. One such moisture sealer that we have used with satisfactory results is a silicone fluid sold under the trade name "555 Fluid." This modification of our preservative composition was prepared by simply adding 1.2 ml. of the silicone "555 Fluid" to 60 ml. of our preferred composition described above.

The experimental tests set forth in the following examples illustrate the invention and its results.

EXAMPLE 1

Two dozen one day old top quality eggs were placed in standard one dozen egg cartons with their large ends upward. One carton received no treatment and was used as the control group. The other carton was sprayed with our preferred diluted oil preservative composition described above. This spraying operation was accomplished by holding the dispensing nozzle of the container about 12 inches above the eggs and in a rapid sweep spraying a fine spray of the oil and Freon solution over the eggs. In this case two sweeps of the spray were made over the eggs which left an oil residue of about 60 mg. to 70 mg. on each egg.

The two cartons of eggs were held for two weeks in a cooler maintained at 55° F. At the ends of the two week period the eggs were weighed and broken out and their Haugh unit values determined in the standard manner. (A Grade A egg has a Haugh unit score of 55 or better.) The test was repeated sixteen times and the data were averaged for each of the eggs in the sixteen tests and are shown in the following table.

Table 1

| Treatment | Wt. loss/egg, gms. | Haugh Units |
| --- | --- | --- |
| Control | 0.80 | 59 |
| Spray treated | 0.30 | 69 |

Another group of two dozen eggs were treated as described above except that they were held for two weeks in an unrefrigerated storage room whose temperature ranged from 68° F. to 76° F. The test was repeated sixteen times and the data were averaged for each of the eggs in the sixteen tests and are shown in the following table.

Table 2

| Treatment | Wt. loss/egg, gms. | Haugh Units |
| --- | --- | --- |
| Control | 2.10 | 41 |
| Spray treated | 0.80 | 58 |

EXAMPLE 2

The tests of Example 1 were repeated in exactly the same manner with the exception that the spray treated eggs were sprayed only once which resulted in an oil residue of only about 30 mg. to 40 mg. being deposited upon each egg. The average weight loss and Haugh unit score for each of the eggs held at 55° F. for two weeks are shown in the following table.

Table 3

| Treatment | Wt. loss/egg, gms. | Haugh Units |
| --- | --- | --- |
| Control | 0.28 | 76 |
| Spray treated | 0.15 | 85 |

The average weight loss and Haugh unit score for each of the eggs held at 68° F. to 76° F. for two weeks are shown in the following table.

Table 4

| Treatment | Wt. loss/egg, gms. | Haugh Units |
|---|---|---|
| Control | 2.90 | 55 |
| Spray treated | 0.71 | 74 |

EXAMPLE 3

A third series of tests was conducted in which two dozen eggs were placed in standard one dozen egg cartons with their large ends upward. One carton received no treatment and was used as the control. The other carton of eggs was sprayed once in the same manner as the eggs in Example 2, but with our modified preservative composition containing 30 ml. of mineral oil, 10 ml. of Freon 11, 20 ml. of Freon 12, and 1.2 ml. of silicone "555 Fluid."

The two cartons of eggs were held for two weeks in a cooler maintained at 55° F., and at the end of the two week period their weight loss was measured and the Haugh unit score determined. The test was repeated sixteen times and the data were averaged for each of the eggs in the sixteen tests and are shown in the following table.

Table 5

| Treatment | Wt. loss/egg, gms. | Haugh Units |
|---|---|---|
| Control | 0.28 | 76 |
| Spray treated | 0.14 | 86 |

Another series of sixteen tests was conducted in which the eggs were sprayed once with the silicone containing composition. In this series of tests the eggs were held for two weeks in an unrefrigerated storage room whose temperature ranged from 68° to 76° F. The data were averaged for each of the eggs and are shown in the following table.

Table 6

| Treatment | Wt. loss/egg, gms. | Haugh Units |
|---|---|---|
| Control | 2.90 | 55 |
| Spray treated | 0.87 | 71 |

All of the eggs used in the three examples set forth above were one day old top quality eggs gathered from flocks of known breeding that were subjected to standard feeding and management practices. Each of the tests, the data from which is shown in Tables 1–6, were repeated sixteen times so that the values shown in each of the tables represents the average values for sixteen dozen eggs.

The results obtained as set forth in Tables 1 and 2 of Example 1 establish that the eggs receiving the spray treatment received the desired preservative effects. The amount of weight lost by the treated eggs was markedly less than the weight lost by the controls, and the Haugh unit scores for the treated eggs were substantially higher than the Haugh unit scores for the controls. The amount of quality preservative afforded by the spray treatment is much more significant in eggs stored at elevated temperatures than it is in eggs stored under refrigeration. Nevertheless, under either storage condition a higher degree of quality is maintained in the spray treated eggs.

The results obtained and set forth in Tables 3 and 4 of Example 2 establish that the desired preservative effects of a diluted oil spray treatment are obtained when each egg receives only 30 mg. to 40 mg. of oil. Under both sets of temperature storage conditions in Example 2 the spray treated eggs had a markedly lower degree of weight loss than did the controls, and their Haugh unit scores were substantially higher than the controls.

The test results obtained in Example 2 show further that an oil residue of about 30 mg. to 40 mg. per egg is sufficient to produce a high degree of preservation and to maintain the quality of the eggs over a two week period at substantially the same level which they had when they were laid. The significance of this reduced amount of oil residue needed for quality maintenance is seen in the reduced cost of preservative material used on each egg and in the savings of time and labor involved in spray treating the eggs.

The results obtained in Example 3 further show that an oil residue of 30 mg. to 40 mg. on each egg is sufficient to produce a satisfactory preservative treatment. The addition of the silicone fluid to the preservative composition produced significantly improved preservative effects over the control eggs both at refrigerated and non-refrigerated temperatures, but these improvements were not significantly better than the results obtained from the spray treatment in which the silicone fluid was not present in the preservative.

The data from all three of the examples establish that our spray treatment need be applied only to the large ends of the shells to produce a high degree of quality maintenance.

In one of the 2,304 eggs used in these series of tests was there any evidence of the microbiological spoilage that is common in oil dipped eggs. Nor was there any undesirable shiny appearance on the shells of the spray treated eggs.

We claim as our invention:

1. A preservative composition adapted to be sprayed onto the large-end areas of the surfaces of shell eggs to preserve the quality thereof, comprising a solution of mineral oil and a volatile diluent adapted to be contained as a sterile, self-propelling solution in a spray dispensing container, said volatile diluent acting to spread the sprayed solution over the sprayed area of the shells for absorption therein and promptly evaporate from the shells to leave the oil sprayed and absorbed over said sprayed large-end areas of the shells, the proportion of oil being such that the quantity of solution applied to the large-end area of each shell in a simple spray application will leave a sealing residue not exceeding about 70 mg. of said oil absorbed in the large-end area of each shell, and said diluent having a boiling point below room temperature and a vapor pressure at room temperature sufficient to pressurize said solution when it is in a spray-dispensing container to propel said solution as a spray from said container.

2. A preservative composition as set forth in claim 1 in which said diluent is a bactericidal mixture of halogenated aliphatic compounds having less than three carbon atoms and having boiling points below room temperature.

3. A preservative composition adapted to be sprayed onto the large-end areas of the surfaces of shell eggs to preserve the quality thereof, comprising a solution of mineral oil, an organosiloxane polymer, and a volatile diluent, adapted to be contained as a sterile, self-propelling solution in a spray dispensing container, said volatile diluent acting to spread the sprayed solution over the sprayed large-end areas of the shells for absorption therein and promptly evaporate from the shells to leave the oil and organosiloxane polymer sprayed and absorbed over said sprayed areas, the proportions of oil and organosiloxane polymer being such that the quantity of said oil and organosiloxane polymer applied to the large-end area of each shell in a simple spray application will leave a sealing residue not exceeding about 70 mg. of said oil and organosiloxane polymer absorbed in the large-end area of each shell, and said diluent having a boiling point below room temperature and a vapor pressure at room temperature sufficient to pressurize said solution when it is in a spray-dispensing container to propel said solution as a spray from said container.

4. The method of preserving shell eggs which comprises treating the large-end areas of the shells, such treatment comprising the steps of spraying onto the shells from a closed spray-dispensing container having a spray nozzle a fine mist of a neutral oil and volatile diluent which completely evaporates therefrom at room temperature within a short period, and thereby leaving a sealing residue not exceeding about 70 mg. of said oil absorbed in the large-end area of the porous shell of each egg to retard the passage of moisture and gas through said large-end area while leaving the small-end area of the shells porous, said solution being propelled from the container at room temperature by the vapor pressure of the diluent in the container.

5. The method according to claim 4 in which the diluent is a fully halogenated aliphatic compound having less than three carbon atoms and boiling below room temperature, said diluent having bactericidal properties whereby the spray mist applied to the eggs is substantially sterile.

6. The method of preserving shell eggs which comprises treating the large-end areas of the shells, such treatment comprising the steps of spraying onto the shells from a closed spray-dispensing container having a spray nozzle a fine mist of a mineral oil, an organosiloxane polymer, and a volatile diluent which completely evaporates therefrom at room temperature within a short period, and thereby leaving a sealing residue not exceeding about 70 mg. of said oil and organosiloxane polymer absorbed in the large-end area of the porous shell of each egg to retard the passage of moisture and gas through said large-end area while leaving the small-end areas of the shells porous, said solution being propelled from the container at room temperature by the vapor pressure of the diluent in the container.

7. The method of preserving eggs as an incident to packing the same in a case, in which packing procedure the eggs are arranged in layers with their large ends upward and the layers are covered and separated by layer dividers, which process of preserving the eggs comprises spraying onto the large ends of the eggs of each layer before such layer is covered with a layer divider, from a closed container having a spray nozzle, a fine spray of mineral oil and a volatile diluent which completely evaporates therefrom at room temperature within a few minutes, and thereby leaving a sealing residue not exceeding about 70 mg. of said oil absorbed in the large-end area of the porous shell overlying the air cell of each egg to retard the passage of gas and moisture through said large-end area while leaving the small-end area of the shells porous, said solution being propelled from the container at room temperature by the vapor pressure of the diluent in the container.

References Cited in the file of this patent

UNITED STATES PATENTS

| | | |
|---|---|---|
| 1,636,420 | Kasser | July 19, 1927 |
| 2,221,343 | Mulvany | Nov. 12, 1940 |
| 2,618,562 | Mulvany | Nov. 18, 1952 |
| 2,757,843 | Smith | Aug. 7, 1956 |
| 2,849,323 | Young | Aug. 26, 1958 |

OTHER REFERENCES

"Food Industries," November 1950, p. 119, article entitled "Pressurized Batter."

UNITED STATES PATENT OFFICE

CERTIFICATE OF CORRECTION

Patent No. 2,876,110                                                  March 3, 1959

William J. Stadelman et al.

It is hereby certified that error appears in the printed specification of the above numbered patent requiring correction and that the said Letters Patent should read as corrected below.

Column 6, line 31, for "In one of the 2,304 eggs used" read -- In none of the 2,304 eggs used --.

Signed and sealed this 1st day of September 1959.

(SEAL)
Attest:

KARL H. AXLINE
Attesting Officer

ROBERT C. WATSON
Commissioner of Patents